United States Patent
Tracy

(10) Patent No.: US 12,043,414 B2
(45) Date of Patent: Jul. 23, 2024

(54) PILOT OPERABLE RUNWAY LIGHT CONTROL

(71) Applicant: Alexander T. Tracy, Frisco, CO (US)

(72) Inventor: Alexander T. Tracy, Frisco, CO (US)

(*) Notice: Subject to any disclaimer, the term of this patent is extended or adjusted under 35 U.S.C. 154(b) by 71 days.

(21) Appl. No.: 18/085,562

(22) Filed: Dec. 20, 2022

(65) Prior Publication Data

US 2023/0192314 A1    Jun. 22, 2023

Related U.S. Application Data

(60) Provisional application No. 63/291,876, filed on Dec. 20, 2021.

(51) Int. Cl.
| | |
|---|---|
| *B64F 1/20* | (2006.01) |
| *B64D 43/00* | (2006.01) |
| *H01H 9/02* | (2006.01) |
| *H04R 1/10* | (2006.01) |
| *H05B 47/19* | (2020.01) |

(52) U.S. Cl.
CPC ............... *B64F 1/20* (2013.01); *B64D 43/00* (2013.01); *H01H 9/0228* (2013.01); *H04R 1/1041* (2013.01); *H05B 47/19* (2020.01); *H04R 2499/13* (2013.01)

(58) Field of Classification Search
CPC ....................................................... B64F 1/20
See application file for complete search history.

(56) References Cited

U.S. PATENT DOCUMENTS

| | | | |
|---|---|---|---|
| 3,122,721 A | 2/1964 | Liu et al. | |
| 3,419,333 A | 12/1968 | Towner | |
| 3,710,157 A * | 1/1973 | Wright | B64F 1/20 340/331 |
| 3,753,039 A | 8/1973 | Bonazoli et al. | |
| 3,771,120 A | 11/1973 | Bonazoli et al. | |
| 3,935,557 A | 1/1976 | Nichols | |
| 4,201,973 A | 5/1980 | Jackson et al. | |
| 4,449,073 A * | 5/1984 | Mongoven | H05B 47/10 315/210 |
| 5,243,340 A | 9/1993 | Norman | |
| 5,426,429 A | 6/1995 | Norman et al. | |
| 6,573,840 B1 | 6/2003 | Norman et al. | |

(Continued)

*Primary Examiner* — Travis R Hunnings
(74) *Attorney, Agent, or Firm* — Crawford I.P. Law; David E. Crawford

(57) ABSTRACT

A runway light control including a relay switch for connecting to a common conductor and a push-to-talk conductor of the aircraft communications system. The control includes a microcontroller connected to the relay switch and an intensity selector assembly connected to the microcontroller. The selector assembly has first, second, and third intensity selectors. The microcontroller is programmed to intermittently close the relay switch a first preselected number of times when the first intensity selector is actuated to signal the automated variable intensity runway light control station to select a first runway light intensity at the airport. The microcontroller is programmed to close the relay switch a second number of times when the second selector is actuated to select a second runway light intensity. The microcontroller is programmed to close the relay switch a third number of times when the third selector is actuated to select a third runway light intensity.

16 Claims, 3 Drawing Sheets

(56) References Cited

U.S. PATENT DOCUMENTS

| | | | |
|---|---|---|---|
| 7,068,188 B1* | 6/2006 | Krause | H05B 39/041 |
| | | | 244/114 R |
| 7,088,263 B1* | 8/2006 | Krause | G08G 5/025 |
| | | | 244/114 R |
| 11,959,773 B2* | 4/2024 | Glomski | G01C 23/005 |
| 2009/0040071 A1* | 2/2009 | Heyn | H05B 47/105 |
| | | | 340/953 |
| 2011/0006920 A1* | 1/2011 | Bauer | G08G 5/0026 |
| | | | 340/972 |
| 2018/0159303 A1* | 6/2018 | Kim | B64F 1/20 |
| 2019/0281680 A1* | 9/2019 | Thorne | G02B 5/3025 |
| 2021/0070469 A1 | 3/2021 | Shemwell | |
| 2021/0250089 A1* | 8/2021 | Thorne | H04B 10/532 |

* cited by examiner

PILOT OPERABLE RUNWAY LIGHT CONTROL

CROSS-REFERENCE TO RELATED APPLICATIONS

The present application claims benefit of U.S. Provisional Patent Application No. 63/291,876 entitled, "Pilot Operable Runway Light Control System" filed Dec. 20, 2021, which is hereby incorporated by reference in its entirety.

BACKGROUND

The present disclosure is directed to a pilot operable runway light control, and more specifically to a runway light control that reduces pilot cognitive workload.

Airports intended for nighttime use have various lighting systems for illuminating runways to aid pilots during take-offs and landings. Basic runway lighting includes lights positioned at intervals adjacent opposite sides of the runway to delineate the runway at night. At many airports, the runway lights have selectively variable intensities so the lights can be set to low, medium, or high intensity. High intensity runway lights are frequently preferred to locate a distant runway, but most pilots prefer a medium or low intensity setting during short approach and landing. Usually, airport personnel manage runway lighting at controlled facilities. Pilots radio airport personnel to adjust the runway light intensity when needed.

Many uncontrolled airstrips also have runway lighting, but the lights are pilot controlled. To use the pilot-controlled lighting, the pilot tunes the aircraft radio to a predetermined frequency corresponding to the airport universal communications station and repeatedly triggers a push-to-talk control on the radio microphone. Triggering the mic when the aircraft is within five miles of an airport, causes the runway lights to switch on and stay on for fifteen minutes. At uncontrolled airports having variable intensity runway lighting, the pilot selects the intensity by triggering the push-to-talk control a specific number of times—three times for low intensity, five times for medium intensity, and seven times for high intensity. Each time a pilot changes the runway light intensity, the fifteen minute timer restarts.

As will be appreciated, managing runway lighting intensity at uncontrolled airstrips increases cognitive or mental workload on pilots. In addition to the mental workload required to perform the numerous tasks necessary to fly the plane, the pilot must keep track of the number of times the push-to-talk control has been triggered to change runway light intensity levels. Higher mental workloads cause decreased performance. Pilots may become overloaded, increasing risk of error, due to the added mental workload required to manage runway lighting intensity, particularly near airports during approach and landing. Thus, there is a need for a runway light control for uncontrolled airstrips that reduces mental workload on pilots allowing the pilots to focus on tasks required to safely operate the airplane. Other aspects of the present disclosure will be apparent in view of the following description and claims.

SUMMARY

In one aspect, the present disclosure includes an aircraft mounted, pilot-operable runway light control for signaling an automated variable intensity runway light control station at an airport to select runway light intensity at the airport. The pilot-operable runway light control comprises a relay switch configured for operatively connecting to a common conductor of an aircraft communications system and to a push-to-talk conductor of the aircraft communications system. The pilot-operable runway light control also comprises a microcontroller operatively connected to the relay switch and a runway light intensity selector assembly operatively connected to the microcontroller. The selector assembly has a first intensity selector, a second intensity selector, and a third intensity selector. The microcontroller is programmed to intermittently close the relay switch a first preselected number of times when the first intensity selector is actuated to signal the automated variable intensity runway light control station to select a first runway light intensity at the airport. Further, the microcontroller is programmed to intermittently close the relay switch a second preselected number of times when the second intensity selector is actuated to signal the automated variable intensity runway light control station to select a second runway light intensity at the airport. The microcontroller is also programmed to intermittently close the relay switch a third preselected number of times when the third intensity selector is actuated to signal the automated variable intensity runway light control station to select a third runway light intensity at the airport.

In another aspect, the disclosure includes an aircraft mounted, pilot-operable runway light control for signaling an automated variable intensity runway light control station at an airport to select runway light intensity at the airport. The aircraft mounted, pilot-operable runway light control comprises a mic connector plug configured for selectively connecting to a corresponding jack in the aircraft cockpit and a mic connector jack configured for selectively connecting to a corresponding plug of an aviation headset. A mic conductor operatively connects the mic connector plug to the mic connector jack, a common conductor operatively connects the mic connector plug to the mic connector jack, and a push-to-talk conductor operatively connects the mic connector plug to the mic connector jack. The pilot-operable runway light control further comprises a relay switch operatively connected to the common conductor and to the push-to-talk conductor. In addition, the pilot-operable runway light control comprises a microcontroller operatively connected to the relay switch and a runway light intensity selector assembly operatively connected to the microcontroller. The selector assembly has a low intensity selector, a medium intensity selector, and a high intensity selector. The microcontroller is programmed to intermittently close the relay switch a first preselected number of times when the low intensity selector is actuated to signal the automated variable intensity runway light control station to select a low runway light intensity at the airport. Further, the microcontroller is programmed to intermittently close the relay switch a second preselected number of times when the medium intensity selector is actuated to signal the automated variable intensity runway light control station to select a medium runway light intensity at the airport. And the microcontroller is programmed to intermittently close the relay switch a third preselected number of times when the high intensity selector is actuated to signal the automated variable intensity runway light control station to select a high runway light intensity at the airport.

In a further aspect of the disclosure, an aircraft mounted, pilot-operable runway light control for signaling an automated variable intensity runway light control station at an airport to select runway light intensity at the airport. The aircraft mounted, pilot-operable runway light control comprises a mic connector plug configured for selectively connecting to a corresponding mic jack in the aircraft cockpit.

The pilot-operable runway light control also comprises a push-to-talk conductor operatively connecting the mic connector plug to a headset mic trigger and a mic conductor operatively connecting the mic connector plug to a first terminal of a headset mic. Further, the runway light control comprises a speaker connector plug configured for selectively connecting to a corresponding speaker jack in the aircraft cockpit and a speaker conductor operatively connecting the speaker connector plug to a first terminal of a headset speaker. The control also includes a common conductor operatively connecting the mic connector plug to a second terminal of the headset mic and operatively connecting the speaker connector plug to a second terminal of the headset speaker. In addition, the runway light control comprises a relay switch operatively connected to the common conductor and to the push-to-talk conductor. The control also includes a microcontroller operatively connected to the relay switch and a runway light intensity selector assembly operatively connected to the microcontroller. The selector assembly has a low intensity selector, a medium intensity selector, and a high intensity selector. The microcontroller is programmed to intermittently close the relay switch a first preselected number of times when the low intensity selector is actuated to signal the automated variable intensity runway light control station to select a low runway light intensity at the airport. Further, the microcontroller is programmed to intermittently close the relay switch a second preselected number of times when the medium intensity selector is actuated to signal the automated variable intensity runway light control station to select a medium runway light intensity at the airport. And the microcontroller is programmed to intermittently close the relay switch a third preselected number of times when the high intensity selector is actuated to signal the automated variable intensity runway light control station to select a high runway light intensity at the airport.

Other aspects of the present disclosure will be apparent in view of the following description and claims.

BRIEF DESCRIPTION OF THE DRAWING

Corresponding reference characters indicate corresponding parts throughout the drawings.

DETAILED DESCRIPTION OF THE DRAWINGS

Figure 1:
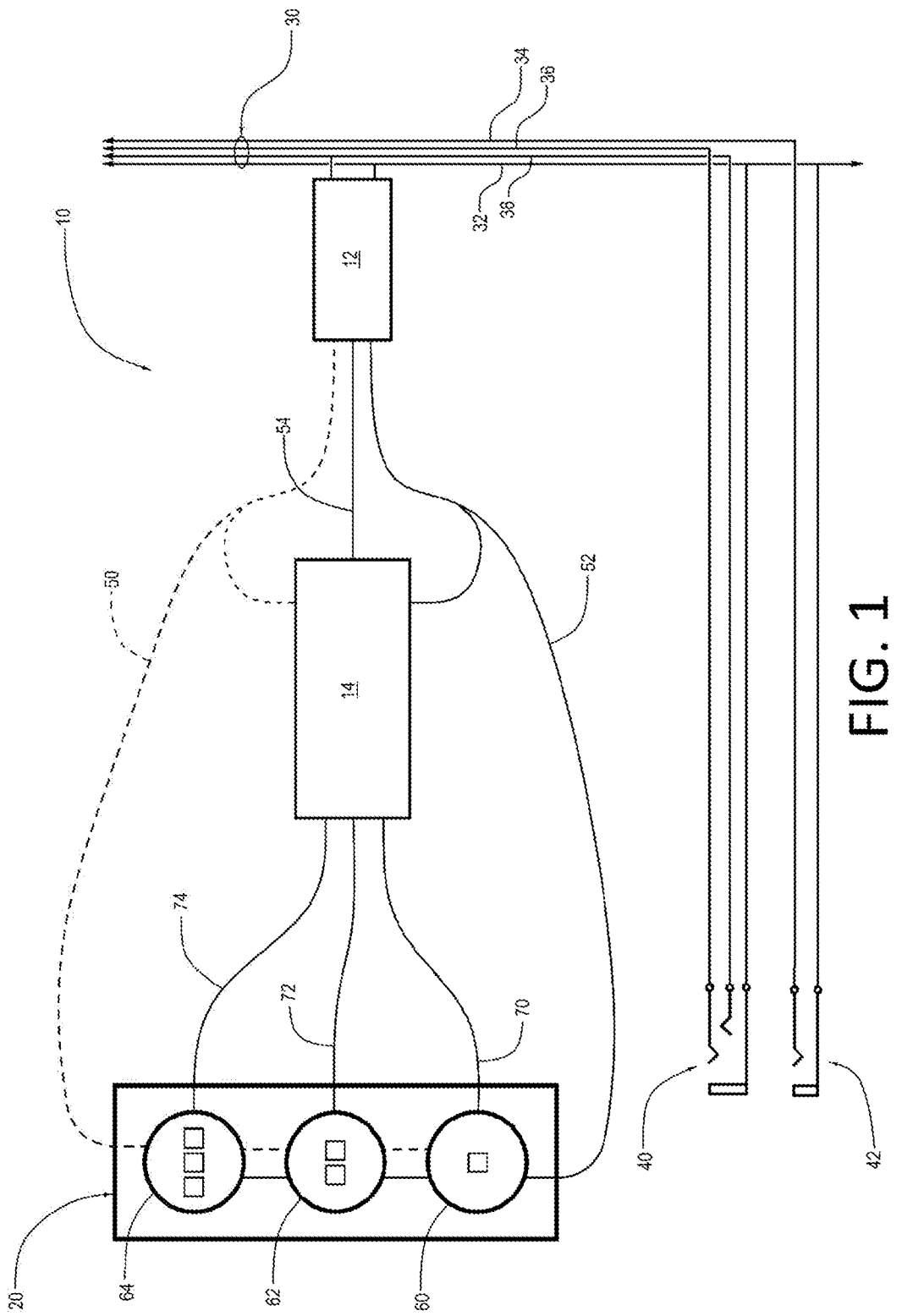
FIG. 1 is a schematic illustration of a first example of a pilot-operable runway light control described below.

In a first example, a pilot-operable runway light control is designated in its entirety by the reference number 10. The control 10 generally comprises a relay switch 12, an electronic microcontroller 14, and a runway light intensity selector assembly (generally designated by 20). The light control 10 is incorporated into a conventional aircraft communications system (partially shown). The communications system includes a cable, generally designated by 30, positioned behind an instrument panel of the aircraft. The cable 30 includes a "ground" or common conductor 32, a speaker conductor 34, a mic conductor 36, and a push-to-talk (PTT) conductor 38. The conductors 32-38 are operatively connected to a pair of jacks 40, 42 mounted on the instrument panel for selectively connecting a general aviation headset (not shown) to the communications system.

The headset includes headphones having two earcups, each of which house a speaker, and a mic mounted on a boom extending from one of the earcups. In some examples, the headset also includes a control module having a push-to-talk (PTT) switch that the pilot triggers when speaking to air traffic control personnel. The PTT switch is often mounted on a yoke in the cockpit that the pilot uses to control aircraft pitch and roll so the switch is readily accessible while steering the aircraft. In the illustrated example, the aviation headset has two plugs that are selectively inserted into the jacks 40, 42. One plug (e.g., a conventional PJ-068 microphone connector) is inserted into the first jack 40 to operatively connect the headset mic and PTT switch to the radio. The first jack 40 is electrically connected to the common conductor 32, the mic conductor 36, and a PPT conductor 38. The other headset plug (e.g., a PJ-055 speaker connector) is inserted into the second jack 42 to operatively connect the speakers in the headphones to the radio. The second jack 42 is electrically connected to the common conductor 32 and the speaker conductor 34. The cable 30, and the jacks 40, 42 are conventional, so the components will not be described in further detail. Although the headset and headset jacks 40, 42 are described as being configured as a conventional two-connector headset system, it is envisioned that other headset connector configurations may be used. Further, the illustrated connector system is commonly found in smaller, fixed-wing, civil aviation aircraft, but those skilled in the art will appreciate the system may be replaced or adapted for use in aircraft having other connectors such as military, helicopter, or multi-pin circular connectors.

As further illustrated in FIG. 1, the relay switch 12, microcontroller 14, and runway light intensity selector assembly 20 are each connected to a common electrical power bus having a conductor 50 operatively connected to a common terminal of a power supply (not shown) and a conductor 52 operatively connected to a positive terminal of the power supply to provide an appropriate microcontroller charge, e.g., 3.3 volts. A lead 54 connects the relay switch 12 to a designated general-purpose input/output pin on the microcontroller 14 that signals the relay switch to close, thereby completing the press-to-talk (PTT) circuit as will be explained. Three pilot-operable buttons 60, 62, 64 are provided on the runway light intensity selector assembly 20. The buttons 60, 62, 64 are labeled to identify button 60 as corresponding to low intensity runway lighting, button 62 as corresponding to medium intensity runway lighting, and button 64 as corresponding to high intensity runway lighting. In the illustrated example, the buttons 60-64 are labeled with raised dots to distinguish them. Button 60 has one raised dot, indicating low intensity runway lighting, button 62 has two raised dots, and button 64 has three raised dots. The buttons 60, 62, 64 are electrically connected to designated general-purpose input/output pins on the microcontroller 14 via electrical leads 70, 72, 74, respectively, to provide input signals to the microcontroller. It is envisioned that the runway light intensity selector assembly 20 may be mounted on or integrated into the cockpit instrument panel or another cockpit surface.

The microcontroller 14 is programmed to intermittently close the relay switch 12 a preselected number of times depending on which of the buttons 60, 62, 64 is pushed by the pilot. When the pilot pushes the low intensity button 60, the microcontroller 14 sends signals to intermittently close the relay switch 12 three times to activate the low intensity runway lights. When the pilot pushes the medium intensity button 62, the microcontroller 14 sends signals to the relay switch 12 to intermittently close the switch five times to activate the medium intensity runway lights. And, when the pilot pushes the high intensity button 64, the microcontroller 14 sends signals to intermittently close the relay switch 12 seven times to activate the high intensity runway lights. When the runway lights are set to high intensity, the pilot may push the medium intensity button 62, to intermittently close the switch 12 five times to adjust the runway lights to medium intensity and reset the light timer to fifteen minutes. As will be appreciated, the pilot operable runway light control 10 does not interfere with manually triggering the mic to adjust the runway light intensity as pilots have done without the control 10. It is envisioned that new aircraft may be built with the control 10 or aircraft may be retrofitted with the control of the first example.

Figure 2:
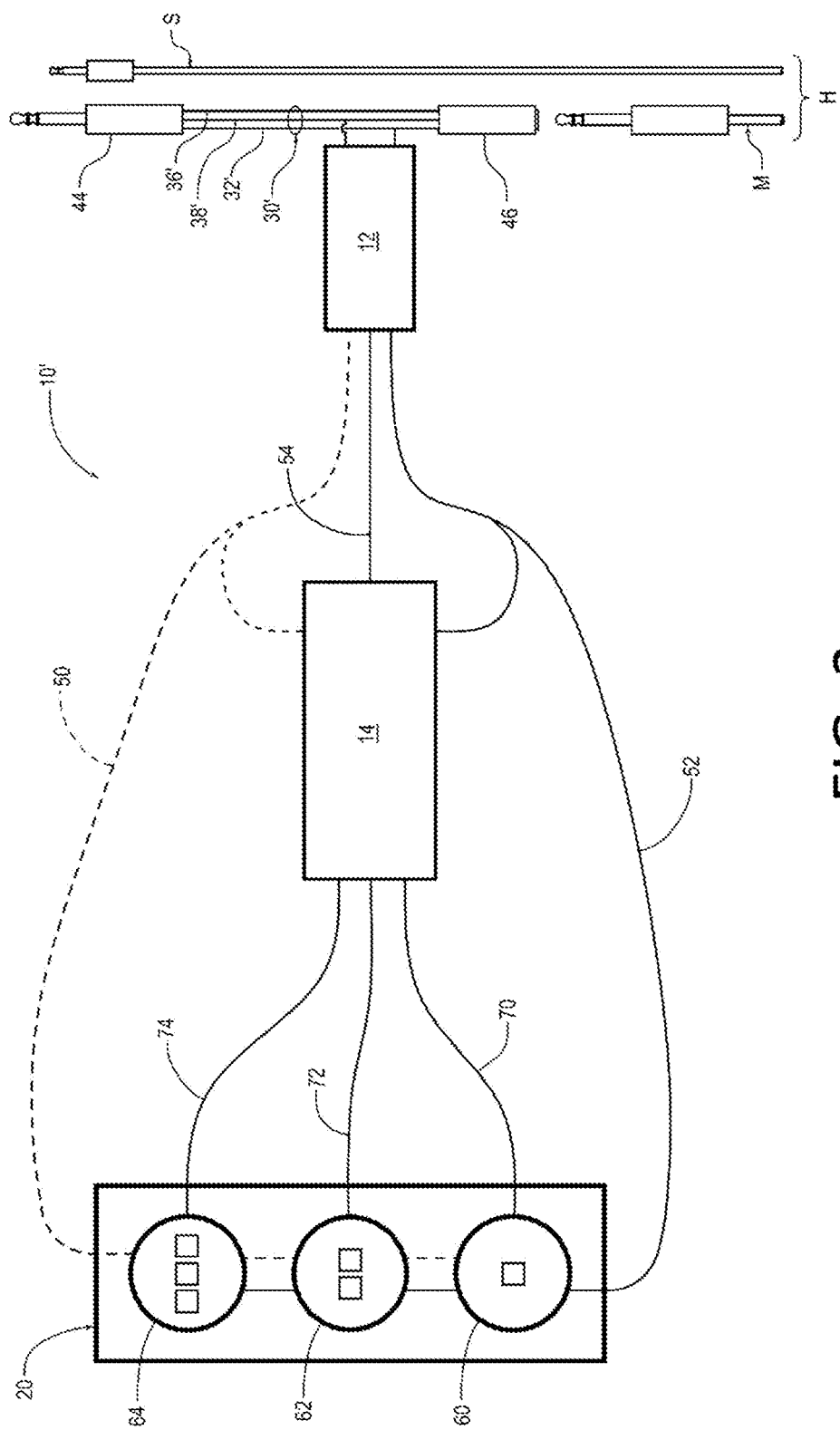
FIG. 2 is a schematic illustration of a second example of a pilot-operable runway light control described below.

As illustrated in FIG. 2, a second example of a pilot-operable runway light control is designated in its entirety by the reference number 10'. Like the control 10 of the first example, the control 10' of the second example generally comprises a relay switch 12, an electronic microcontroller 14, and a runway light intensity selector assembly 20. Rather than being connected directly to a cable positioned behind the instrument panel, the relay switch 12 is connected to a cable 30' having a mic plug 44 (e.g., a conventional PJ-068 microphone connector) at one end a mic jack 46 (e.g., a PJ-068 connector) at its other end. The cable 30' includes three conductors—a common conductor 32', a mic conductor 36', and a PPT conductor 38'. As will be appreciated, the mic plug 44 is inserted into the corresponding jack on the aircraft instrument panel, a headset H mic plug M is inserted into the mic jack 46, and a headset speaker plug S is inserted into the corresponding speaker jack on the instrument panel to connect the control 10' in series with the headset. Thus, the headset H functions normally, and the control 10' functions similarly to the control 10 of the first example. Rather than being incorporated into a conventional aircraft communications system like control 10, the control 10' of the second example may be connected in series between a conventional headset H and a conventional aircraft communications system to provide functionality similar to the control of the first example in an aircraft without an integrated control. As before, the pilot operable runway light control 10' does not interfere with manually triggering the mic to adjust the runway light intensity. The control 10' of the second example is suited for aircraft that do not include the control 10 of the first example.

As will be appreciated, the pilot-operable runway light control 10' may be modified without departing from the intended scope of this disclosure. For example, the control 10' may be mounted in a housing (not shown) having a plug 44 extending from one face for engaging a mic jack on the aircraft instrument panel and a jack 46 provided on another face of the housing for receiving a headset mic plug. In this alternative example, it is envisioned that the buttons 60, 62, 64 may be provided on a face of the housing such as the face having the jack 14 where the pilot has access.

Figure 3:
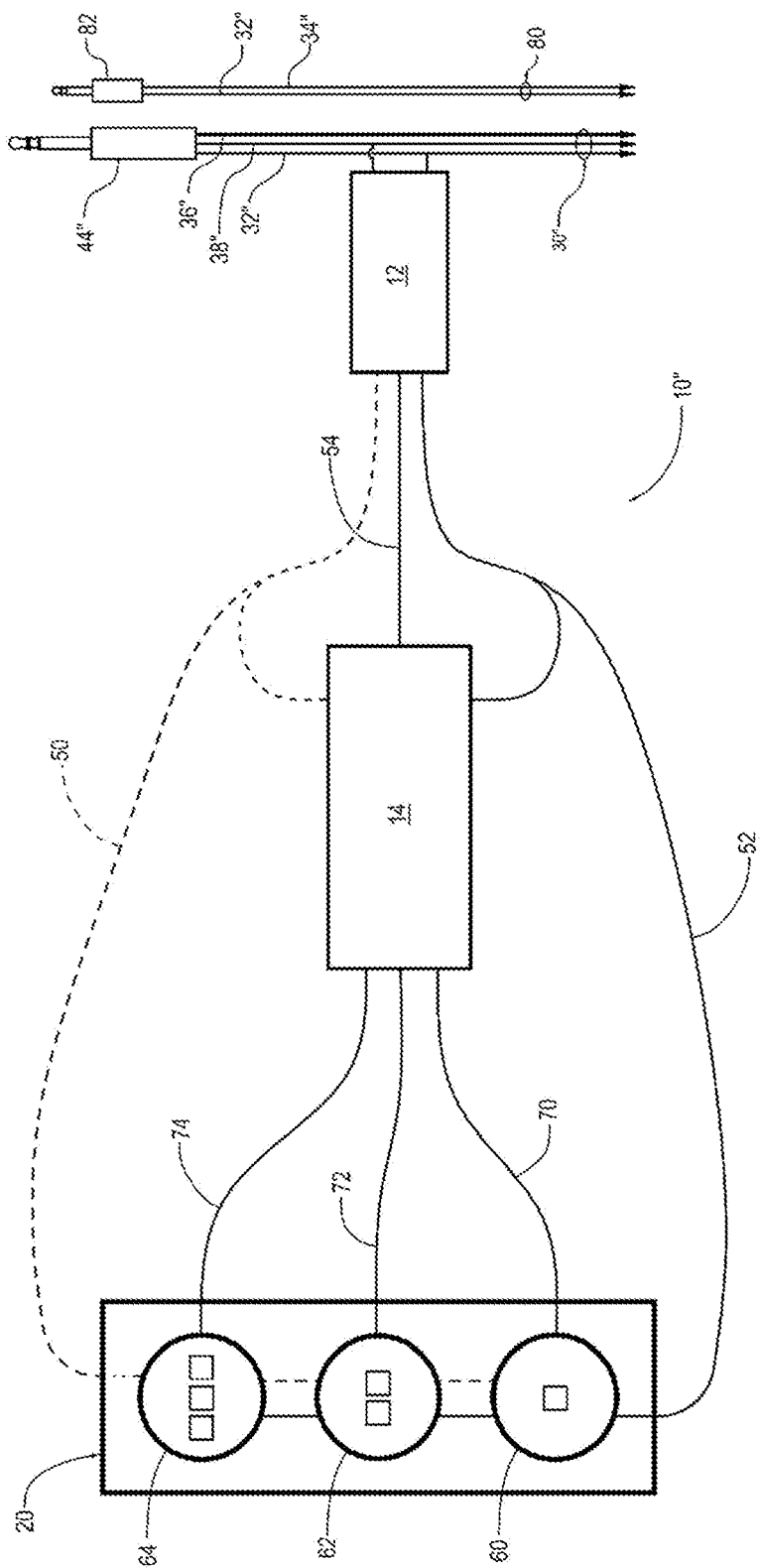
FIG. 3 is a schematic illustration of a third example of a pilot-operable runway light control described below.

FIG. 3 illustrates a third example of a pilot-operable runway light control 10" incorporated into a conventional aviation headset (partially shown). The headset includes a three conductor cable 30' having a mic plug 44" at one end a two-conductor cable 80 having a speaker plug 82 at one end. The headset is connected to the aircraft by inserting the mic plug 44" into the corresponding jack on the instrument panel and the speaker plug 80 into the corresponding speaker jack on the panel. The control 10" of the third example also include a relay switch 12, an electronic microcontroller 14, and a runway light intensity selector assembly 20. As will be appreciated by those skilled in the art, the relay switch 12 is connected to the common conductor 32" and the PPT conductor 38" in the cable 30". When the headset is connected to the aircraft communications system, the control 10" functions similarly to the controls 10, 10' of the first and second examples. Like the control 10' of the second example, the control 10" of the third example is suited for aircraft that do not have a built-in runway light control.

Although other power supplies may be used, in the illustrated examples the control 10 is powered by the aircraft electrical system (i.e., conductors 50 and 52 are electrically connected to the aircraft electrical system), and the controls 10', 10" are powered by batteries housed with the relay switch 12 and the microcontroller 14.

It is envisioned that the controls 10, 10', 10" may be modified to signal other airport automated controls (e.g., PPT-controlled gates) instead of, or in addition to, the automated variable intensity runway light control station as described. Such a modification is intended to be within the scope of the claims.

When introducing elements in this description, the articles "a", "an", "the", and "said" are intended to mean that there are one or more of the elements. The terms "comprising", "including", and "having" are intended to be inclusive and mean that there may be additional elements other than the listed elements.

As those skilled in the art could make various changes to the above constructions, products, and methods without departing from the intended scope of the description, all matter in the above description and accompanying drawings should be interpreted as illustrative and not in a limiting sense. The patentable scope of the disclosure is defined by the claims, and can include other constructions and methods that would occur to those skilled in the art. Such other constructions are intended to be within the scope of the claims if the structural elements of the constructions do not differ from the literal language of the claims, or if the constructions include equivalent structural elements having insubstantial differences from the literal languages of the claims.

To the extent that the specification, including the claims and accompanying drawings, discloses any additional subject matter that is not within the scope of the claims below, the disclosures are not dedicated to the public and the right to file one or more applications to claims such additional disclosures is reserved.

The invention claimed is:

1. An aircraft mounted, pilot-operable runway light control for signaling an automated variable intensity runway light control station at an airport to select runway light intensity at the airport, said aircraft mounted, pilot-operable runway light control comprising:

a relay switch configured for operatively connecting to a common conductor of an aircraft communications system and to a push-to-talk conductor of the aircraft communications system;

a microcontroller operatively connected to the relay switch; and a runway light intensity selector assembly operatively connected to the microcontroller, said selector assembly having a first intensity selector, a second intensity selector, and a third intensity selector;

wherein:

the microcontroller is programmed to intermittently close the relay switch a first preselected number of times when the first intensity selector is actuated to signal the automated variable intensity runway light control station to select a first runway light intensity at the airport;

the microcontroller is programmed to intermittently close the relay switch a second preselected number of times when the second intensity selector is actuated to signal the automated variable intensity runway light control station to select a second runway light intensity at the airport; and the microcontroller is programmed to intermittently close the relay switch a third preselected number of times when the third intensity selector is actuated to signal the automated variable intensity runway light control station to select a third runway light intensity at the airport.

2. The aircraft mounted, pilot-operable runway light control as set forth in claim 1, wherein:

the first intensity selector comprises a low intensity selector; and the microcontroller is programmed to intermittently close the relay switch three times when the low intensity selector is actuated to signal the automated variable intensity runway light control station to select a low runway light intensity at the airport.

3. The aircraft mounted, pilot-operable runway light control as set forth in claim 1, wherein:

the second intensity selector comprises a medium intensity selector; and the microcontroller is programmed to intermittently close the relay switch five times when the medium intensity selector is actuated to signal the automated variable intensity runway light control station to select a medium runway light intensity at the airport.

4. The aircraft mounted, pilot-operable runway light control as set forth in claim 1, wherein:

the third intensity selector comprises a high intensity selector; and the microcontroller is programmed to intermittently close the relay switch seven times when the high intensity selector is actuated to signal the automated variable intensity runway light control station to select a high runway light intensity at the airport.

5. The aircraft mounted, pilot-operable runway light control as set forth in claim 1 wherein:

the first intensity selector comprises a low intensity selector;

the second intensity selector comprises a medium intensity selector;

the third intensity selector comprises a high intensity selector;

the microcontroller is programmed to intermittently close the relay switch three times when the low intensity selector is actuated to signal the automated variable intensity runway light control station to select a low runway light intensity at the airport;

the microcontroller is programmed to intermittently close the relay switch five times when the medium intensity selector is actuated to signal the automated variable intensity runway light control station to select a medium runway light intensity at the airport; and the microcontroller is programmed to intermittently close the relay switch seven times when the high intensity selector is actuated to signal the automated variable intensity runway light control station to select a high runway light intensity at the airport.

6. The aircraft mounted, pilot-operable runway light control as set forth in claim 1, further comprising:

a mic connector plug configured for selectively connecting to a corresponding jack in the aircraft cockpit;

a mic connector jack configured for selectively connecting to a corresponding plug of an aviation headset;

a common conductor operatively connecting the mic connector plug to the mic connector jack; and a push-to-talk conductor operatively connecting the mic connector plug to the mic connector jack;

wherein the relay switch is operatively connected to the common conductor of the cable and to the push-to-talk conductor of the cable, thereby operatively connecting the relay switch to the common conductor of the aircraft communications system and to the push-to-talk conductor of the aircraft communications system when the mic connector plug is connected to the corresponding jack in the aircraft cockpit.

7. The aircraft mounted, pilot-operable runway light control as set forth in claim 1, further comprising:

a mic connector plug configured for selectively connecting to a corresponding mic jack in the aircraft cockpit;

a push-to-talk conductor operatively connecting the mic connector plug to a headset mic trigger;

a mic conductor operatively connecting the mic connector plug to a first terminal of a headset mic;

a speaker connector plug configured for selectively connecting to a corresponding speaker jack in the aircraft cockpit;

a speaker conductor operatively connecting the speaker connector plug to a first terminal of a headset speaker; and a common conductor operatively connecting the mic connector plug to a second terminal of the headset mic and operatively connecting the speaker connector plug to a second terminal of the headset speaker;

wherein the relay switch is operatively connected to the common conductor and to the push-to-talk conductor, thereby operatively connecting the relay switch to the common conductor of an aircraft communications system and to the push-to-talk conductor of the aircraft communications system when the mic connector plug is connected to the corresponding jack in the aircraft cockpit.

8. An aircraft mounted, pilot-operable runway light control for signaling an automated variable intensity runway light control station at an airport to select runway light intensity at the airport, said aircraft mounted, pilot-operable runway light control comprising:

a mic connector plug configured for selectively connecting to a corresponding jack in the aircraft cockpit;

a mic connector jack configured for selectively connecting to a corresponding plug of an aviation headset;

a mic conductor operatively connecting the mic connector plug to the mic connector jack;

a common conductor operatively connecting the mic connector plug to the mic connector jack;

a push-to-talk conductor operatively connecting the mic connector plug to the mic connector jack;

a relay switch operatively connected to the common conductor and to the push-to-talk conductor;

a microcontroller operatively connected to the relay switch; and a runway light intensity selector assembly operatively connected to the microcontroller, said selector assembly having a low intensity selector, a medium intensity selector, and a high intensity selector;

wherein:

the microcontroller is programmed to intermittently close the relay switch a first preselected number of times when the low intensity selector is actuated to signal the automated variable intensity runway light control station to select a low runway light intensity at the airport;

the microcontroller is programmed to intermittently close the relay switch a second preselected number of times when the medium intensity selector is actuated to signal the automated variable intensity runway light control station to select a medium runway light intensity at the airport; and the microcontroller is programmed to intermittently close the relay switch a third preselected number of times when the high intensity selector is actuated to signal the automated variable intensity runway light control station to select a high runway light intensity at the airport.

9. The aircraft mounted, pilot-operable runway light control as set forth in claim 8, wherein the microcontroller is programmed to intermittently close the relay switch three times when the low intensity selector is actuated to signal the automated variable intensity runway light control station to select a low runway light intensity at the airport.

10. The aircraft mounted, pilot-operable runway light control as set forth in claim 8, wherein the microcontroller is programmed to intermittently close the relay switch five times when the medium intensity selector is actuated to signal the automated variable intensity runway light control station to select a medium runway light intensity at the airport.

11. The aircraft mounted, pilot-operable runway light control as set forth in claim 8, wherein the microcontroller is programmed to intermittently close the relay switch seven times when the high intensity selector is actuated to signal the automated variable intensity runway light control station to select a high runway light intensity at the airport.

12. The aircraft mounted, pilot-operable runway light control as set forth in claim 8, in combination with an aviation headset comprising:

an earcup housing a speaker;

a mic mounted on a boom extending from the earcup;

a headset speaker plug configured for selectively connecting to a corresponding speaker jack in the aircraft cockpit; and a speaker conductor operatively connecting the headset speaker plug to a first terminal of the speaker;

wherein:

the mic conductor is operatively connected to a first terminal of the mic; and the common conductor is operatively connected to a second terminal of the speaker and to a second terminal of the mic.

13. An aircraft mounted, pilot-operable runway light control for signaling an automated variable intensity runway light control station at an airport to select runway light intensity at the airport, said aircraft mounted, pilot-operable runway light control comprising:

a mic connector plug configured for selectively connecting to a corresponding mic jack in the aircraft cockpit;

a push-to-talk conductor operatively connecting the mic connector plug to a headset mic trigger;

a mic conductor operatively connecting the mic connector plug to a first terminal of a headset mic;

a speaker connector plug configured for selectively connecting to a corresponding speaker jack in the aircraft cockpit;

a speaker conductor operatively connecting the speaker connector plug to a first terminal of a headset speaker; and a common conductor operatively connecting the mic connector plug to a second terminal of the headset mic and operatively connecting the speaker connector plug to a second terminal of the headset speaker;

a relay switch operatively connected to the common conductor and to the push-to-talk conductor;

a microcontroller operatively connected to the relay switch; and a runway light intensity selector assembly operatively connected to the microcontroller, said selector assembly having a low intensity selector, a medium intensity selector, and a high intensity selector;

wherein:

the microcontroller is programmed to intermittently close the relay switch a first preselected number of times when the low intensity selector is actuated to signal the automated variable intensity runway light control station to select a low runway light intensity at the airport;

the microcontroller is programmed to intermittently close the relay switch a second preselected number of times when the medium intensity selector is actuated to signal the automated variable intensity runway light control station to select a medium runway light intensity at the airport; and the microcontroller is programmed to intermittently close the relay switch a third preselected number of times when the high intensity selector is actuated to signal the automated variable intensity runway light control station to select a high runway light intensity at the airport.

14. The aircraft mounted, pilot-operable runway light control as set forth in claim 13, wherein the microcontroller is programmed to intermittently close the relay switch three times when the low intensity selector is actuated to signal the automated variable intensity runway light control station to select a low runway light intensity at the airport.

15. The aircraft mounted, pilot-operable runway light control as set forth in claim 13, wherein the microcontroller is programmed to intermittently close the relay switch five times when the medium intensity selector is actuated to signal the automated variable intensity runway light control station to select a medium runway light intensity at the airport.

16. The aircraft mounted, pilot-operable runway light control as set forth in claim 13, wherein the microcontroller is programmed to intermittently close the relay switch seven times when the high intensity selector is actuated to signal the automated variable intensity runway light control station to select a high runway light intensity at the airport.

* * * * *